United States Patent [19]

Röösli

[11] Patent Number: 5,291,423

[45] Date of Patent: Mar. 1, 1994

[54] ARRANGEMENT FOR MONITORING THE QUALITY OF ELECTRIC WELDS

[75] Inventor: Hans Röösli, Bassersdorf, Switzerland

[73] Assignee: Elpatronic AG, Zug, Switzerland

[21] Appl. No.: 719,644

[22] Filed: Jun. 21, 1991

Related U.S. Application Data

[63] Continuation of Ser. No. 442,902, Nov. 29, 1989, abandoned.

[30] Foreign Application Priority Data

Dec. 16, 1988 [CH] Switzerland ............... 04655/88-9

[51] Int. Cl.$^5$ .................... G01N 3/20; B23K 9/10
[52] U.S. Cl. .................... 364/552; 219/109; 73/850; 364/554
[58] Field of Search .......... 364/550, 551.01, 552, 364/507, 477, 554; 219/109, 110, 64, 117.1; 73/850; 324/693, 699, 716, 718; 33/522

[56] References Cited

U.S. PATENT DOCUMENTS

| | | | |
|---|---|---|---|
| 4,434,351 | 2/1984 | Nakata et al. | 219/109 X |
| 4,447,698 | 5/1984 | Van Sikle et al. | 219/110 |
| 4,447,700 | 5/1984 | Cohen | 219/109 X |
| 4,562,330 | 12/1985 | Hamilton | 219/109 X |
| 4,596,917 | 6/1986 | Neid et al. | 219/117.1 X |
| 4,714,816 | 12/1987 | Pazzaglia | 219/109 |
| 4,734,640 | 3/1988 | Kitahori et al. | 219/109 X |
| 4,763,286 | 8/1988 | Nishimura et al. | 364/552 |
| 4,860,226 | 8/1989 | Martin et al. | 364/552 |
| 4,862,385 | 8/1989 | Fujita et al. | 364/550 X |
| 4,887,025 | 12/1989 | Re Fiorentin et al. | 324/643 |

FOREIGN PATENT DOCUMENTS

| | | | |
|---|---|---|---|
| 0014271 | 8/1980 | European Pat. Off. | 219/109 |
| 1462171 | 2/1989 | U.S.S.R. | 324/693 |

OTHER PUBLICATIONS

"Handbook of Mathematical Functions"—Milton Abramowitz & Irene A. Stegun—Dover Publications, Inc., New York 1965 p. 933.

"Warum SOUDRONIC Frequenzwandler-Schweissmaschinen" FIGS. 5, 6, 7, 8 & 10. (Company's own advertising) May 1985.

"Statistische Methoden und ihre Anwendungen" pp. 126–129 Erwin Kreyszig 1975.

Primary Examiner—Thomas G. Black
Assistant Examiner—Michael Zanelli
Attorney, Agent, or Firm—McCormick, Paulding & Huber

[57] ABSTRACT

What is described is an arrangement for monitoring the quality of electric welds on bodies (10) for the production of cans. Welding parameter values ($F_i$), which have been measured on a number of bodies (10) found to be good are statistically evaluated in an evaluation device (22). For this purpose, an average welding parameter profile is determined. Then a reject limiting-value band ($F_{g\pm}$) enveloping the average welding parameter profile is determined from the mean values and the product of the standard deviation of the welding parameter values ($F_i$) assumed to be normally distributed and at least one sensitivity factor. A permissible number of erroneous rejects per one million of welding spots is selected as a criterion for the sensitivity factor so that, for example with 100 welding spots on a body (10) of a medium-sized can, every ten thousandth body will be accidentally rejected on the average. For bodies (10) produced following on the "learning phase", a comparator (26) ascertains whether a welding parameter profile measured for these lies within the reject limiting-value band ($F_{g\pm}$). This quality control arrangement working on statistical methods is sensitive and precise since a fixed value is not simply selected for the width of the reject limiting-value band.

18 Claims, 3 Drawing Sheets

ARRANGEMENT FOR MONITORING THE QUALITY OF ELECTRIC WELDS

This is a continuation of co-pending application Ser. No. 07/422,902 filed on Nov. 29, 1989, now abandoned.

The invention relates to an arrangement for monitoring the quality of electric welds on bodies for the production of cans, having at least one device for detecting at least one welding parameter profile, having a store for storing the first welding parameter profile and having a comparator for comparing the first welding parameter profile with a second parameter profile measured later, in order to determine their degree of agreement.

BACKGROUND OF THE INVENTION

In a known arrangement of this kind (EP-A2-0 153 298), the aim is to detect precisely the variation of the welding parameter in time and to define precisely a desired run of data associated with a welding operation, in the course of which various marginal conditions, particularly the kind of material, the thickness of material, a coating of the material, the basic parameter of the particular welding machine etc., are to be taken into consideration and the data obtained are to be combined and evaluated in accordance with various programs. For this purpose, in the known arrangement, a favorable course of the welding parameter is determined for each individual welding position on a sample workpiece having a plurality of welding positions, and is stored. The store can be programmed through a microprocessor so that it is possible to select a welding pattern w is recognized as being particularly favorable and also store its data profile as a desired profile for following like welding operations. Then, when the welding machine is in series operation, the associated reference data for the particular welding position, are retained as a desired profile in the store, and recalled. As a result of interrogating the instantaneous values of the welding parameter during the welding operation, a data profile result is compared, in a comparator, with the stored data profile corresponding to the desired course of the welding operation. Output signals are generated according to the degree of agreement found. If a minimum degree of agreement is found, the weld can be evaluated as "good". It is not stated, however, how the limiting value for the minimum degree of agreement between desired and actual course, for which the weld can be evaluated as "good" is set. It is to be assumed that a fixed value is set which is at a certain margin from the desired course. In order that the set limiting value may be able to be used for the whole length of the weld seam, without too many satisfactory welds being rejected as "poor", a relatively large set limiting value must be selected. Otherwise, great deviations usually occurring at the beginning and end of the weld seam would continuously lead to erroneous rejects. The known device is therefore not very sensitive and not very precise in quality control.

OBJECTS OF THE INVENTION

It is the object of the invention to increase the sensitivity and the precision in quality control in an arrangement of the kind mentioned at the beginning.

According to the invention, this problem is solved in that an evaluation device is provided for the statistical evaluation of measured welding parameter values of a number of can bodies found to be good, by determining an average welding parameter profile which is stored in the store as the first welding parameter profile, and by determining a reject limiting-value band enveloping the average welding parameter profile from the average values of the welding parameter values measured for the first welding parameter profile, and from the product of the standard deviation of these welding parameter values assumed to be normally distributed and a sensitivity factor, and that, for can bodies subsequently produced, the comparator determines whether the second welding parameter profile measured for these lies within the reject limiting-value band.

According to the invention, therefore, a desired data profile of the absolute value of the welding parameter or of the variations in the welding parameter is not found on a sample can body but, in a learning phase, the average value of the welding parameter over the length of the can body is determined from a plurality of can bodies found to be good and, as a result of the deviation in the measured values observed in the course of this, the two reject limiting value curves defining the reject limiting value band are determined, while a certain sensitivity is selected, f or example in such a manner that only every ten thousandth good can body is rejected.

In the arrangement according to the invention, therefore, the measured welding parameters are examined with regard to their statistical behavior. Only "good" can bodies are included in the statistics. After the welding machine has been adjusted so that the can bodies produced have the desired quality, a first statistic is built up in the learning phase. The cans produced during this learning phase are checked at least roughly for quality (for example by visual checking, micrographs, tearing-open tests, X-ray examination etc.). Experiments have shown that the welding parameter values measured for the individual welding positions are normally distributed, that is to say they have Gaussian distribution or normal distribution. This means that the statistical characteristics of the welding parameter values (distribution curve) are determined by average value and variance.

The important difference from the known arrangement is therefore to be seen, in that by determining a reject limiting-value band enveloping the average welding parameter profile, from a plurality of can bodies found to be good and selective probability for the rejection of a can body which is actually good, a better sensitivity and an optimum precision are achieved with the arrangement according to the invention. For this purpose, the user only has to fix the sensitivity in the arrangement according to the invention. In the usual case, the sensitivity for exceeding the lower and upper limiting value respectively, can be set separately. The criterion for this is preferably the number of erroneous rejects per million of weld spots. The question as to how many erroneous rejects are permissible can be answered with reference to the quality requirements in each case.

It is an important feature of the arrangement according to the invention, that an optimum tolerance band is determined for each specific production condition, the kind of sheet metal, machine setting or the like. In contrast to the known arrangement where two straight lines are simply used and a constant upper and lower limiting value over the whole length of the can body is preset by a potentiometer, in the arrangement according to the invention, a tolerance profile is used which is adapted to the production situation. This tolerance profile makes it possible to work with a broader reject limiting-value band in the beginning and in the end region of the length of the can body, where experience has shown that the deviations in the measured welding parameter values are particularly great, than over the middle of the length of the can body, for example, where experience has shown that the deviation is considerably less.

By means of the statistics used as an aid in the arrangement according to the invention, an automatic adaption to the constant quality of the tested can bodies can be achieved. Even if, for example poor sheet-metal material or "unsteady" machines cause widely scattered measured values, this is automatically detected by the higher deviation value and the limiting values become greater. What the arrangement according to the invention does here automatically, is often done unconsciously by a person setting a limiting value manually, since they will adjust the potentiometer so that a good can body is rejected sporadically, but not too often.

After the first statistics of the good can bodies have been made available by the learning phase and so the reject limiting values have been fixed, the can bodies which have been found good, continue to be followed statistically in the above-mentioned manner by the arrangement according to the invention, during the whole production. As a result, it is possible to produce a quality display.

Advantageous developments of the invention form the subject of the sub-claims.

Examples of embodiment of the invention are described in more detail below, with reference to the drawings.

DETAILED DESCRIPTION OF THE INVENTION

Figure 1:
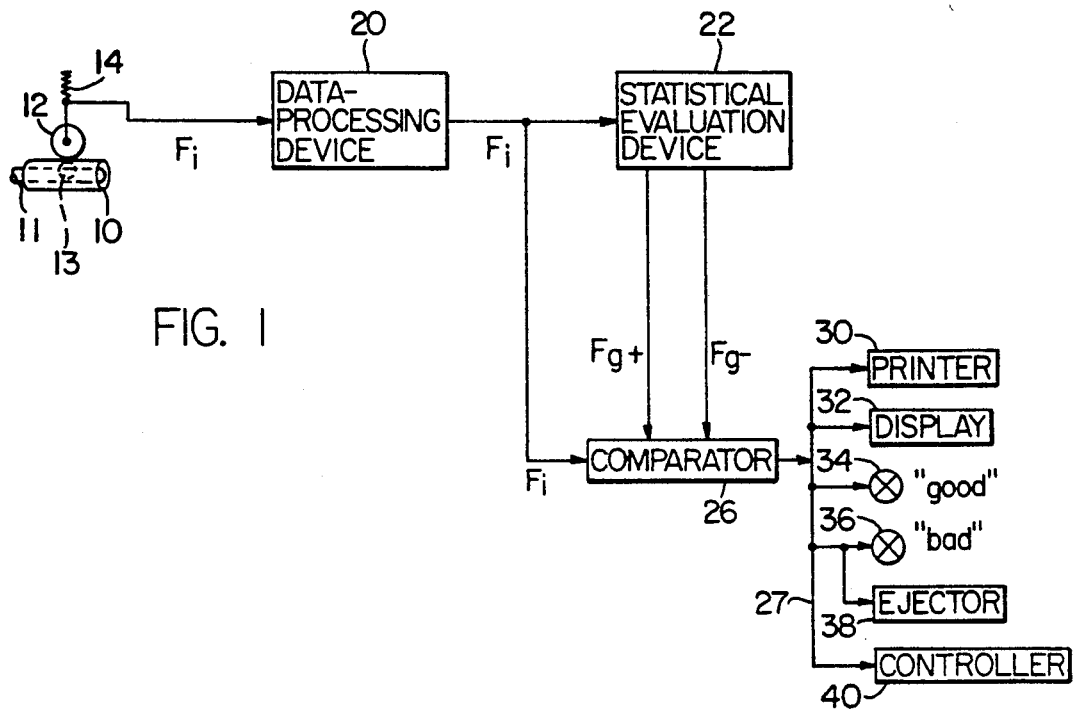
FIG. 1 shows diagrammatically, the construction of the arrangement according to the invention for monitoring the quality of electric welds on bodies for the production of cans.

An arrangement for monitoring the quality of electric welds on bodies 10 for the production of cans is described below, in connection with an alternating-current seam welding apparatus which latter, according to the diagrammatic partial illustration in FIG. 1, comprises a welding arm 11 on which the can bodies 10 are moved forward (towards the right in FIG. 1), and in the course of this are welded together in the region of their longitudinal seam, between a lower welding roller 13 secured to the welding arm 11, and an upper welding roller 12 pressed against the lower roller by means of a spring 14, as a result of a welding current flowing between the electrode rollers through the can-body material. Each half-wave of the welding current leads to the production of a welding spot. In successive half-waves of the welding current, the welding current has the one polarity or the other. With regard to further details, reference should be made to the company brochure of Soudronic AG, "Warum SOUDRONIC Frequenzwandler-Schweissmaschinen", September 1979, for example pages 6–8.

In the machine, for example at the upper electrode roller 12, according to the diagrammatic illustration in FIG. 1, one (or more) welding parameter $F_i$ is measured by sensors (not illustrated). The welding parameter $F_i$ may be the welding current, the voltage at the welding position, the product of these quantities (power/energy), the seam temperature, the travel of a pendulum roller head which carries the upper electrode roller 12 or the like. Each welding parameter $F_1$ is preprocessed in a data processing device 20 in such a manner that a digital numerical value is produced for each welding spot i (with i = 1, 2, 3, ... n). Such a preprocessing may consist in that the electrical signals of the sensors are filtered for the purpose of eliminating superimposed interference signals. Another method of processing the measured values may consist in forming the said product of welding current and voltage, and integrating it over the duration of a welding spot (spot energy). These preprocessed measured values are meant when welding parameters or welding parameter values or spot values are referred to below. In the arrangement described below, the spot values supplied by the individual sensors, and processed in the manner described above are examined with regard to their statistical behavior for each criterion (energy, temperature etc.).

Figure 2:
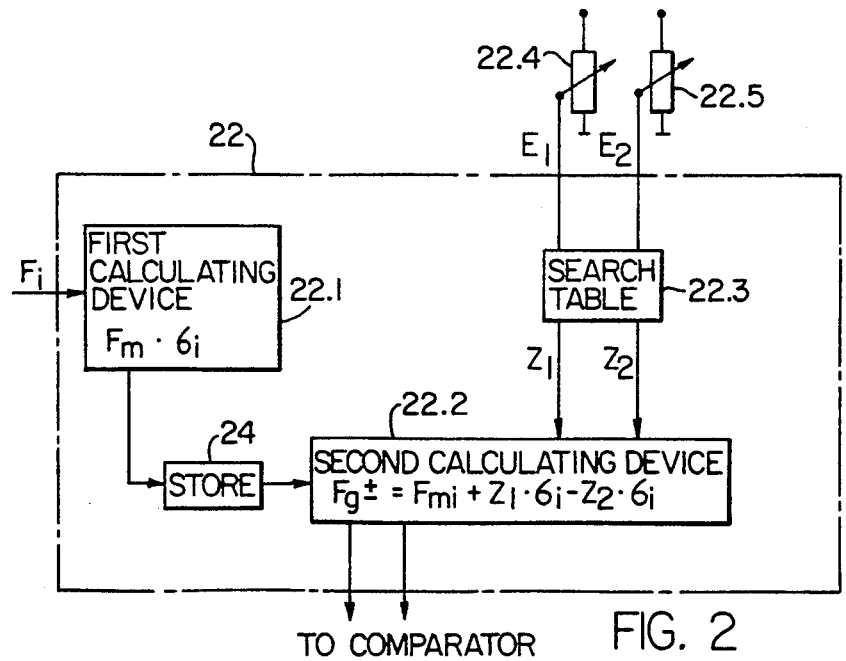
FIG. 2 shows, as a detail, a block circuit diagram of a statistical evaluation device according to FIG. 1.

For this purpose, the welding parameter values are supplied to a statistical evaluation device 22. According to the more detailed illustration in FIG. 2, the statistical evaluation device 22 contains a first calculating device 22.1, to the input of which the welding parameter value $F_i$ is fed and the output of which is connected to the input of store 24. The output of the store 24 is connected to one input of a second calculating device 22.2. This has a further input which is connected to the output of an input device 22.3 which comprises a search table. The search table contains a number of sensitivity factors which can be addressed through the inputs of the input device 22.3 according to the sensitivities $E_1$ and $E_2$ selected. The selectivity of the sensitivities $E_1$, $E_2$ is represented symbolically by potentiometers 22.4, 22.5. The search table may also be replaced by a calculation by means of microprocessors (not illustrated). The second calculating device 22.2 has two outputs which lead to two inputs of a comparator 26 (FIG. 1). At a third input, the comparator 26 receives the welding parameter values $F_i$. The output of the comparator 26 is connected to a data bus 27, to which parallel signal processing devices 20, 32, 34, 36, 38, 40 are connected, which are explained in more detail below.

Figure 3:
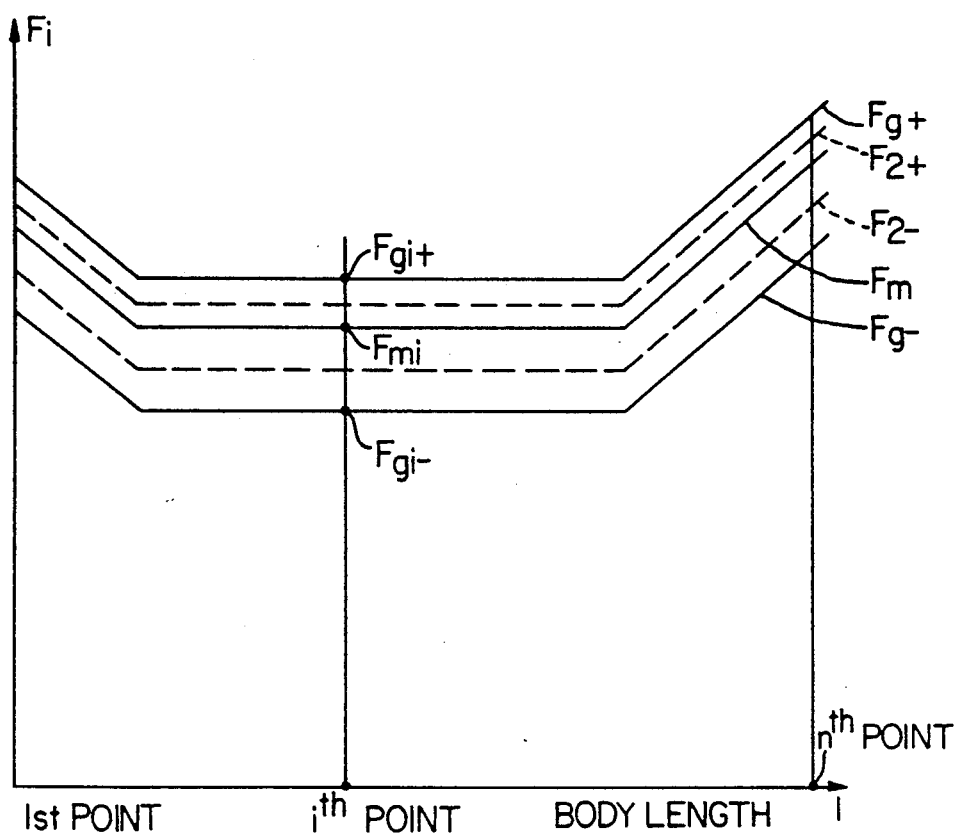
FIG. 3 and 4 are explanatory diagrams.
Figure 4:
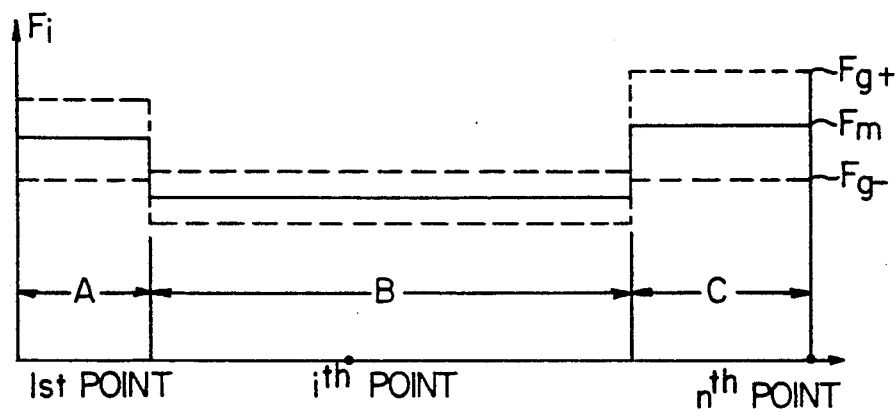

First, the first calculating device 22.1 determines an average welding parameter profile $F_m$ from the welding parameter values $F_i$, then the profile is stored in the store 24 and is illustrated in the form of two different curves in FIGS. 3 and 4.

There are two possibilities for determining the curves $F_m$, namely as the arithmetical mean value of the absolute measured values or as the arithmetical mean value of the difference formed between each two successive measured values.

In a learning phase, for which 20 to 100 can bodies are generally used, a first statistic is built up. On each can body, the $i^{th}$ spot is measured and the welding parameter values found in all $i^{th}$ spots of all the can bodies are averaged, which produces mean values $F_{mi}$ over the length 1 of the can bodies from the first to the $n^{th}$ spot (FIG. 3 and 4).

The welding parameter values have a normal or Gaussian distribution. The distribution function is characterized by the mean value $F_m$ and the standard deviation $\sigma$. A Gaussian curve is clearly defined by the mean value $F_m$ and the standard deviation $\sigma$. The standard deviation is a measure of the extent to which the measured values are scattered and defines the range in which 66% of all measured values lie. The two base points of the standard deviation (one base point in the negative direction at one side of the mean value, and one base point in the positive direction on the other side of the mean value) and the mean value thus clearly defines a Gaussian curve. With regard to further details, reference should be made to the handbook "Statistische Methoden und ihre Anwendungen" by E Kreyszig, Verlag Vandenhoeck & Ruprecht, Göttingen, second, unaltered reprint of the 7th edition, pages 125-129. The first calculating device 22.1 calculates $F_{mi}$ and $\sigma_i$ for each spot i consecutively. The calculation of $F_{mi}$ is effected as an arithmetical mean value as explained above. The calculation of $\sigma_i$ is effected in accordance with the equation $$\sigma_i = \sqrt{\frac{1}{m-1} \sum_{j=1}^{m} (F_{ij} - F_{mi})^2} \quad (1)$$

in which $\sigma_i$ = standard deviation in the $i^{th}$ spot
m = number of can bodies in the learning phase
j = current can body
$F_{ij}$ = random sample value of the $i^{th}$ spot of the $j^{th}$ can body $$F_{mi} = \frac{1}{m} \sum_{j=1}^{m} F_{ij}$$

The mean value profile $F_m$ and the profile of the standard deviations $\sigma_i$ are stored in the store 24 from which they can be fetched when necessary by the second calculating device 22.2. The second calculating device 22.2 calculates the reject limiting-value band $F_{g\pm}$ from the following equations $$F_{gi+} = F_{mi} + z_1 \sigma_i \quad (2)$$

$$F_{gi-} = F_{mi} - z_2 \sigma_i \quad (3)$$

with i = 1, 2, 3 ... n and $F_{gi}$ = reject limiting value in the it spot of the welding seam,
$F_{mi}$ = mean value of the welding parameter in the $i^{th}$ spot of the welding seam,
$z_1$ = sensitivity factor or reciprocal quantity of the sensitivity for upper reject limiting value, and
$z_2$ = sensitivity factor or reciprocal quantity of the sensitivity for lower reject limiting value,
$\sigma_i$ = standard deviation for the $i^{th}$ spot of the welding seam, In accordance with the characteristics of normal distribution, there is a definite probability that the limiting value $F_{gi+}$ or $F_{gi-}$ will be exceeded. According to the magnitude of $z\sigma_i$, can bodies which are actually good are rejected more or less frequently. The smaller $z\sigma_i$ is, the more sensitively the arrangement reacts to defects, but good can bodies are also rejected more frequently.

In the following explanations, a reject limiting-value band is assumed, for the sake of simplification, which is symmetrical to the average welding parameter profile FM, that is to say the case $E_1 = E_2 = E$ and $z_1 = z_2 = z$.

The "good/bad" criterion is derived from the desired sensitivity of the arrangement. This is defined so that a proportion, determined by the user, of good can bodies may be classified as bad. Thus, an objective rejection criterion is laid down which is here called the sensitivity E. It is defined as the number of erroneous rejects per million of can bodies. The sensitivity value $E = 100$ therefore means, 100 erroneous rejects per 1 million of can bodies or that, on the average, every ten thousandth can body is accidentally rejected. In a body welding machine which produces 600 can bodies per minute, this means that a good can body is accidentally rejected every quarter of an hour.

The sensitivity factor z can be addressed through the potentiometers 22.4, 22.5 in the search table 22.3 which contains a number of sensitivity factors concerned. z is the reciprocal value of the sensitivity E. The greater z is, the less sensitive is the arrangement. Values concerned for z are shown from the said handbook, pages 128 and 129, from which it can be seen that (with $F_m$ written instead of $\mu$):

About 95% of all values lie between $F_m - 2\sigma$ and $F_m + 2\sigma$,
about 99$\frac{3}{4}$% of all values lie between $F_m - 3\sigma$ and $F_m + 3\sigma$, and
about 99.9% of all values lie between $F_m - 3.29\sigma$ and $F_m + 3.29\sigma$.

In these cases therefore
z = 2
z = 3
z = 3.29
applies.

According to the literature, for example "Handbook of Mathematical Functions", Ed. M. Abramowitz and I. Stegun, Dover Publications, Inc., New York, December 1972, page 933, z can be calculated with a satisfactory approximation as follows:

$$z = \sqrt{-\frac{\pi}{2} \ln(1 - A^2)}$$

in which A = the probability that the limiting value will not be exceeded.

Therefore, if for example 99.0000% of all spots should lie within the (symmetrical) reject limiting-value band, A =0.999999 and the calculation gives z =4.54. As a result of experience gained, a value between 3 and 5 and preferably the value 4.54 is selected for z. The last-mentioned value corresponds to 99.9999%, that is to say the case in which per 1 million of weld spots, one is accidentally judged as "bad". With 100 weld spots on the body of a medium sized can, every ten thousandth body is thus accidentally rejected on the average.

The second calculating device 22.2 takes the addressed value of z from the input device 22.3, and then calculates the reject limiting-value band in accordance with the equations (2) and (3), the associated values of $F_{mi}$ being taken from the store 24 each time. Two reject limiting-value curves thus calculated, which define the band at the top and bottom are designated by $F_{g+}$ and $F_{g-}$ respectively in FIGS. 3 and 4. The reject limiting-value curves $F_{g+}$ and $F_{g-}$ are stored in a store not illustrated in the second calculating device and delivered to the comparator 26 when necessary.

The processing and evaluation procedure described above is carried out for the 100 bodies found to be good, in the learning phase. Subsequently, that is to say during the production phase of the welding machine, the welding parameter values are processed as in the learning phase but are then preferably supplied to the comparator 26 which therefore ascertains, for bodies 10 produced following on the learning phase, whether the second welding parameter profile measured for these which, more precisely, is likewise formed from the corresponding mean values $F_{mi'}$ lies within the reject limiting-value band $F_{g+}$. The comparator 26 delivers an output signal depending on the result of the comparison to the signal processing devices 30 to 40. These include a printer 30 which prints out the result of the comparison, a display device 32 which displays the result of the comparison, a signal lamp 34 which indicates whether a body was "good", an indicator lamp 36 which indicates whether a body was "bad", an ejector 38 which ejects the body simultaneously with the actuation of the signal lamp 36, and a controller 40 which re-adjusts the measured welding parameter with a correcting action if a deviation trend should occur, which is explained in more detail below.

From the fact that certain faulty mechanisms become apparent as a result of the fact that a plurality of successive spots cause statistically significant deviations, further (lower) limiting values can be fixed as follows:

$$F_2 = F_m + z\sigma_i$$

in which case only one defect is signalled if $F_2$ is exceeded on two successive measurements, $F_3$ on three successive measurements etc. The deviations $z\sigma_i$ can again be defined in each case so that, for example, every thousandth good body is rejected. The reject limiting-value band $F_{2\pm}$ for $F_2$ is shown in FIG. 3.

If two isochronous criteria (for example, seam squeezing and spot energy) are available, a further possibility for forming the limiting value results in such a manner that a so-called correlation limiting value $F_k$ is defined. In this case, a rejection is effected if, for a certain weld spot, both spot values exceed their correlation limiting value $F_k$.

A simplification of the procedure results if $i^{th}$ spot is not evaluated for the statistics as in FIG. 3 but regions are combined. In the example illustrated in FIG. 4, only three statistics are given instead of n, namely for the regions A, B and C, that is to say for the beginning, middle and end respectively of the body. Each region comprises 10 to 20 weld spots which are combined to form a mean value per region for the statistical evaluation.

The arrangement described here is suitable for continuous quality control, which is described below with reference to FIGS. 5a, 5d.

After a first statistic of the good bodies has been made available by the learning phase and so the reject limiting-values have been fixed, the bodies which have been found to be good continue to be followed statistically by the above-mentioned methods during the whole production run. Thus it is possible to produce a quality display.

Figure 5A:
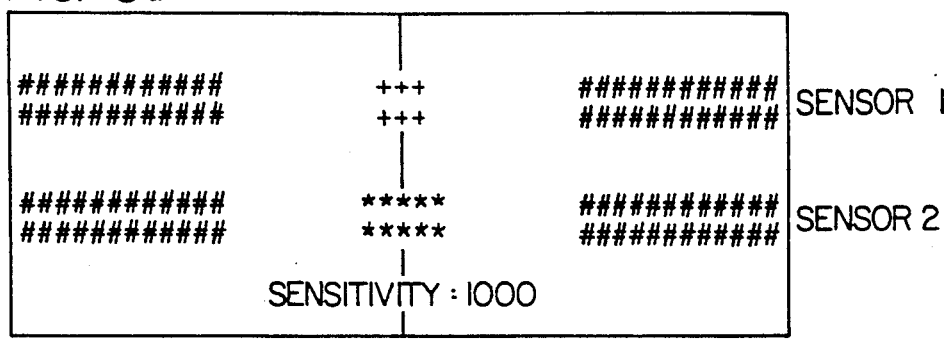
FIG. 5a–5d are diagrams to explain a continuous quality control which can be carried out by means of the arrangement according to the invention.
Figure 5B:
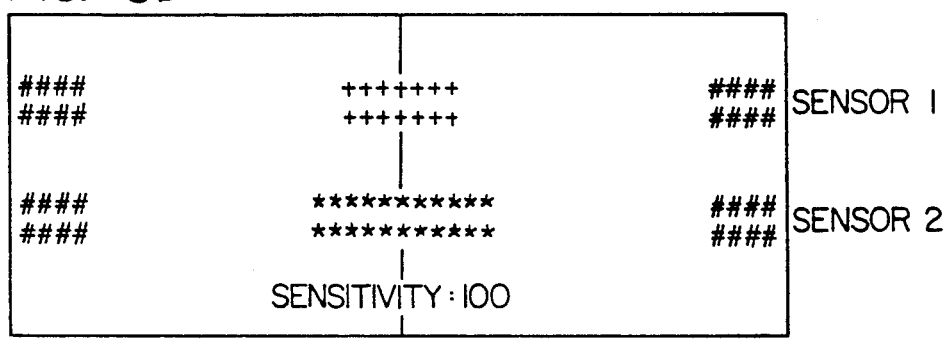

The illustration in FIG. 5a is the starting position with little deviation and high sensitivity, $E = 1000$. FIG. 5b shows the starting position with average deviation and low sensitivity, $E = 100$.

Thus, the illustrations according to FIGS. 5a and 5b, show the mean values and the scattering of the measured values with the selected sensitivity $E = 1000$ and $E = 100$ respectively. The scattering and the sensitivity are relative values, the physical significance of which does not need to be known to the user. A high sensitivity means a higher probability that here and there a good body will be rejected. A high dispersion can have various causes: poor material, unstable machine setting, contamination of the machine etc.

Figure 5C:
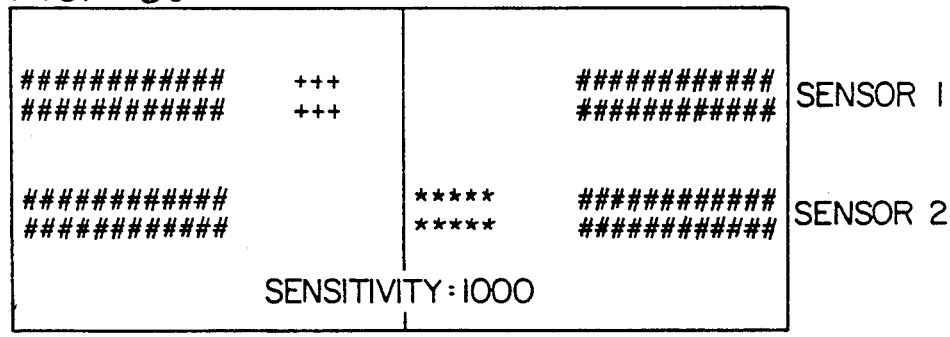
Figure 5D:
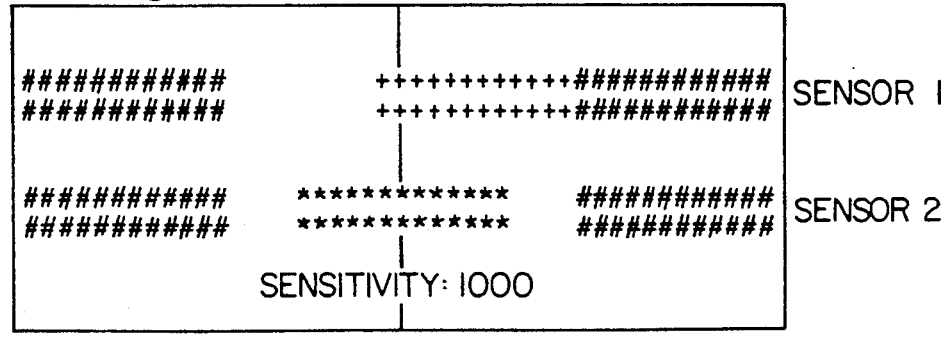

FIGS. 5c and 5d show possible variations after a starting position according to FIG. 5a. FIG. 5c shows a drift in the measurements and FIG. 5d shows a drifting mean value and increasing dispersion, in which case the sensor 1 sets off an alarm. The drifting away of the mean values might have the following causes:

Drift of the sensors 1, 2 as a result of heating of the machine,

Variation in a machine setting or in the material properties.

The variation in the dispersion could have the following causes:

Increasing contamination,

Something on the welding machine has become "shaky".

As soon as an alarm value is reached (represented graphically in FIG. 5d by the fact that the measured values represented by plus symbols are touching the boundary), the user must check the quality of production. If the quality is still good, he can reach the illustration shown in FIG. 5a again by pressing a function key "learning". In this case, the deviations have been caused by influences which do not impair the welding quality (for example temperature drift of the measuring device). This alarm value can be so defined for example that it is equal to ten times the value of the permitted reject quota.

The data formed by the continuous quality check, make it possible to intervene automatically with a correcting action, for example in that the welding current is re-adjusted by means of the controller 40 in such a manner that the mean values return to the starting position shown in FIG. 5a.

I claim:

1. An apparatus for monitoring the quality of electric welds on can bodies, each can body having a weld seam formed by a plurality of welds extending continuously along the length of a can body each weld being associated with a welding parameter of a given value, said apparatus comprising:

means for receiving weld signal indicative of the value of the welding parameter as measured for each weld, with a set of said parameter values of each weld seam;

at least one means for determining from said weld signals an average welding parameter profile ($F_m$) computed from a group of acceptable weld seam parameter value sets measured on a plurality of acceptable welded can bodies;

store means to store the average welding parameter profile;

a comparator to compare the average welding parameter profile with welding parameter profiles measured later on subsequently welded can bodies for determining a degree of agreement between the average welding parameter profile and each of said subsequently welded can body welding parameter profiles; and evaluation means for providing statistical evaluation of said subsequently welded can body welding parameter profiles and determining a reject limiting-value band ($F_{g\pm}$) from computed mean welding parameter values for each weld in said group of acceptable weld seam parameter value sets and from the product of a standard deviation of said welding parameter values for each weld in said group of acceptable weld seam parameter value sets assumed to be normally distributed and at least one weld quality sensitivity factor;

the comparator further generating output signals indicative of whether each welding parameter value of said subsequently welded can body welding parameter profiles lie within the reject limiting-value band ($F_{g\pm}$).

2. The apparatus according to claim 1, for an alternating-current seam welding device wherein each half-wave of the welding current produces a "welding spot", and wherein the evaluation device comprises a first calculating device which determines the average welding parameter profile ($F_m$) for the welding spots of the weld seam over a number of can bodies which have been found to be good, and a second calculating device which determines the reject limiting values for the reject limiting-value band ($F_{g\pm}$) for each welding spot.

3. The apparatus according to claim 2, wherein the number of acceptable can bodies the first calculating device for determining the average welding parameter profile ($F_m$), is between 20 and 100.

4. The apparatus according to claim 2 wherein the welding profiles comprise a plurality of regions corresponding to respective portions of the weld seams with said limiting values of said reject limiting band being of a different magnitude in at least one of said regions.

5. The apparatus according to claim 4, characterized in that each of said regions comprises 10 to 20 welding spots.

6. The apparatus according to claim 2 further comprising an input device for the sensitivity factor which is connected to the second calculating device.

7. The apparatus according to claim 6, wherein the input device comprises an addressable search table which contains a number of weld quality sensitivity factors.

8. The apparatus according to claim 2 wherein the second calculating device calculates the reject limiting-value band ($F_{g\pm}$) from the relationships $$F_{gi+} = F_{mi} + a_1 \sigma_i$$

$$F_{gi-} = F_{mi} - z_2 \sigma_i$$

with i = 1, 2, 3 ... n and $F_{gi}$ = reject limiting value in the i$^{th}$ spot of the weld seam, $F_{mi}$ = mean value of the welding parameter in the i$^{th}$ spot of the weld seam, $z_1$ = sensitivity factor or reciprocal quantity of the sensitivity for the upper reject limiting value, $z_2$ = sensitivity factor or reciprocal quantity of the sensitivity for the lower reject limiting value, $\sigma_i$ = standard deviation of the with spot of the weld seam.

9. The apparatus according to claim 8 wherein $z_1 \neq z_2$ so that the reject limiting-value band ($F_{g\pm}$) envelops the average welding parameter profile ($F_m$) asymmetrically.

10. The apparatus according to claim 8 wherein $z_1 = z_2 = z$, so that the reject limiting value band ($F_{g\pm}$) envelops the average welding parameter profile ($F_m$) symmetrically.

11. The apparatus according to claim 1 wherein the weld quality sensitivity factor is between 3 to 5 and is preferably 4.54.

12. The apparatus of claim 1 wherein the evaluation means further generates a running average of welding parameter values of said subsequently welded can body welding parameter profiles with corresponding mean welding parameter values of said acceptable group of weld seam parameter value sets and wherein said comparator generates error signals is said running average exceeds said reject limiting-value band ($F_{g\pm}$).

13. The apparatus of claim 1 wherein the values of said reject limiting value band ($F_{g\pm}$) vary in dependence of the position of the weld along the weld seam, 14. The apparatus of claim 1 wherein said evaluation means further generates a running average of welding parameter values of said subsequently welded can body welding parameter profiles and wherein said comparator generates error signals if said running average exceeds said reject limiting-value band ($F_{g\pm}$).

15. The apparatus of claim 1 further comprising:

means for receiving first and second weld signals indicative of the value of corresponding first and second welding parameters as measured for each weld, with corresponding first and second sets of said welding parameter values for each weld seam;

said evaluation means further for determining, for each of said welding parameter sets, a reject limiting-value band ($F_{g\pm}$) enveloping the average welding parameter profile ($F_m$) from computed mean welding parameter values for each weld in said acceptable group of weld seam parameter value sets and from the product of a standard deviation of welding parameter values for each weld in said acceptable group of weld seam parameter value sets and at least one weld quality sensitivity factor;

the comparator further comprising said first and second welding parameter value sets with each other and generating an error signal should either of said values of said first and second welding parameter signal sets exceed a cross correlation limiting value ($F_k$).

16. Apparatus for monitoring the quality of welds on can bodies, each body having a weld seam extending along the length of the can body and being composed of a plurality of individual welds, said apparatus comprising:

means for measuring a welding parameter value associated with the formation of each weld in a weld seam extending along the length of a can body and establishing a welding parameter profile composed of the measured values along the weld seam;

memory means for storing as welding parameter profiles the values of the welding parameter from a plurality of weld seams determined to be good weld seams;

means for statistically evaluating the stored values of the welding parameter profiles of the good weld seams and determining an average welding parameter profile ($F_m$);

means for also storing in the storing means the average welding parameter profile ($F_m$) as the first welding parameter profile;

means for statistically evaluating the stored values of the welding parameter profiles of the good welding seams and determining a reject limiting-value band ($F_g\pm$) enveloping the average welding parameter profile ($F_m$) from the mean values of the stored welding parameter values used to determine the first welding parameter profile and from the product of a standard deviation of these welding parameter profiles assumed to be normally distributed and at least one sensitivity factor; and comparator means for establishing that a second welding parameter profile measured along the weld seam of another can body by the means for measuring lies within the reject limiting-value band ($F_g\pm$).

17. An apparatus for monitoring the quality of electric welds on can bodies, each can body having a weld seam formed by a plurality of welds extending continuously along the length of a can body, each weld being associated with a welding parameter of a given value, said apparatus comprising:

means for receiving weld signals indicative of the value of the welding parameter as measured for each weld, with a set of said parameter values for each weld seam;

at least one means for determining from said weld signals an average welding parameter profile (Fm) computed from a group of acceptable weld seam parameter value sets measured on a plurality of acceptable welded can bodies;

store means to store the average welding parameter profile;

a comparator to compare the average welding parameter profile with welding parameter profiles measure later on subsequently welded can bodies for determining a degree of agreement between the average welding parameter profile and each of said subsequently welded can body welding parameter profiles;

evaluation means for providing statistical evaluation of said subsequently welded can body welding parameter profiles and determining a reject limiting-value band ($Fg\pm$) enveloping the average welding parameter profile ($F_m$) from computed mean welding parameter values for each weld in said group of acceptable weld seam parameter value sets and from the product of a standard deviation of said welding parameter values for each weld in said group of acceptable weld seam parameter value sets assumed to be normally distributed and at least one weld quality sensitivity factor;

the comparator further generating output signals indicative of whether each welding parameter value of said subsequently welded can body welding parameter profiles lies within the reject limiting-value band ($Fg\pm$); and signal processing means including a can body ejector connected with the comparator and responsive to the output signals for ejecting a can body if the measured welding parameter profile for the body does not lie within the reject limiting-value band ($F_g\pm$).

18. An apparatus for monitoring the quality of electric welds on can bodies, each can body having a weld seam formed by a plurality of welds extending continuously along the length of a can body each weld being associated with a welding parameter of a given value, said apparatus comprising:

means for receiving weld signals indicative of the value of the welding parameter as measured for each weld, with a set of said parameter values for each weld seam;

at least one means for determining from said weld signals an average welding parameter profile (Fm) computed from a group of acceptable weld seam parameter value sets measured on a plurality of acceptable welded can bodies;

store means to store the average welding parameter profile;

a comparator to compare the average welding parameter profile with welding parameter profiles measured later on subsequently welded can bodies for determined a degree of agreement between the average welding parameter profile and each of said subsequently welded can body welding parameter profiles;

evaluation means for providing statistical evaluation of said subsequently welded can body welding parameter profiles and determining a reject limiting-value band (Fg±) enveloping the average welding parameter profile ($F_m$) from computed mean welding parameter values for each weld in said group of acceptable weld seam parameter value sets and from the product of a standard deviation of said welding parameter values for each weld in said group of acceptable weld seam parameter value sets assumed to be normally distributed and at least one weld quality sensitivity factor;

the comparator further generating output signals indicative of whether each welding parameter value of said subsequently welded can body welding parameter profiles lies within the reject limiting-value band (Fg±); and a controller responsive to the comparator output signals and generating signals to adjust said welding parameter value to bring said subsequently welded can body welding parameter values within the reject limiting-value band (Fg±).

* * * * *